(12) United States Patent
Olsen et al.

(10) Patent No.: US 10,855,499 B2
(45) Date of Patent: Dec. 1, 2020

(54) DEMODULATOR FOR USE IN RADIO COMMUNICATION RECEIVERS

(71) Applicant: Nordic Semiconductor ASA, Trondheim (NO)

(72) Inventors: Eivind Sjøgren Olsen, Trondheim (NO); Sverre Wichlund, Trondheim (NO); Ruben Undheim, Trondheim (NO); Meng Cai, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 16/466,625

(22) PCT Filed: Dec. 4, 2017

(86) PCT No.: PCT/GB2017/053652
§ 371 (c)(1),
(2) Date: Jun. 4, 2019

(87) PCT Pub. No.: WO2018/104716
PCT Pub. Date: Jun. 14, 2018

(65) Prior Publication Data
US 2019/0349228 A1 Nov. 14, 2019

(30) Foreign Application Priority Data
Dec. 5, 2016 (GB) .................................. 1620668.2

(51) Int. Cl.
*H04L 27/00* (2006.01)
*H04B 1/7073* (2011.01)
(Continued)

(52) U.S. Cl.
CPC ....... *H04L 27/0014* (2013.01); *H04B 1/7073* (2013.01); *H04B 1/7093* (2013.01);
(Continued)

(58) Field of Classification Search
CPC .................. H04B 1/703; H04B 1/7093; H04L 2027/0024; H04L 2027/0026; H04L 2027/0095
See application file for complete search history.

(56) References Cited

U.S. PATENT DOCUMENTS 6,005,885 A   12/1999   Warren et al.
6,529,548 B1   3/2003   Aoki et al.
(Continued)

FOREIGN PATENT DOCUMENTS

WO   WO 2015/189584   12/2015

OTHER PUBLICATIONS

International Search Report and Written Opinion for PCT/GB2017/053652, dated Apr. 16, 2018, 21 pages.
(Continued)

*Primary Examiner* — Shuwang Liu
*Assistant Examiner* — Gina M McKie
(74) *Attorney, Agent, or Firm* — Klarquist Sparkman, LLP

(57) ABSTRACT

A radio receiver device is arranged to receive a radio signal modulated with a data packet including an address portion. The radio receiver comprises:
 a synchronisation circuit portion arranged to produce synchronization information corresponding to the data packet;
 a demodulation circuit portion comprising a correlator, wherein said demodulation circuit portion is arranged to receive the radio signal and to produce an estimate of the address portion comprising a plurality of demodulated bits using said correlator and the synchronisation information;
 an address checking circuit portion arranged to receive the plurality of demodulated bits, to check said plurality of
(Continued)

demodulated bits for a predetermined bit pattern, and to produce a match flag if it determines that the plurality of demodulated bits corresponds to the predetermined bit pattern.

The radio receiver device is arranged such that, upon detecting an upcoming timeout event, the demodulation circuit portion sends a timeout warning signal to the address checking circuit portion using a handshaking channel therebetween; said address checking circuit portion being arranged such that, if it receives the timeout warning signal, it stops checking the plurality of demodulated bits for the predetermined bit pattern.

38 Claims, 5 Drawing Sheets

(51) Int. Cl.
*H04B 1/7093* (2011.01)
*H04L 27/16* (2006.01)
*H04L 27/233* (2006.01)

(52) U.S. Cl.
CPC .......... *H04L 27/16* (2013.01); *H04L 27/2334* (2013.01); *H04L 2027/0026* (2013.01); *H04L 2027/0095* (2013.01)

(56) References Cited

U.S. PATENT DOCUMENTS

| | | | |
|---|---|---|---|
| 2003/0153289 A1* | 8/2003 | Hughes | H03G 3/001 455/138 |
| 2012/0144406 A1* | 6/2012 | Colombo | G06F 9/541 719/328 |
| 2012/0314741 A1 | 12/2012 | Arita et al. | |
| 2013/0195229 A1 | 8/2013 | Cheng et al. | |
| 2016/0072652 A1 | 3/2016 | Wichlund et al. | |
| 2017/0238328 A1* | 8/2017 | Luong | H04W 72/085 370/329 |
| 2018/0263001 A1* | 9/2018 | O'Brien | H04B 1/0007 |
| 2019/0296858 A1* | 9/2019 | Ganwani | H03M 13/23 |

OTHER PUBLICATIONS

Search Report under Section 17(5) for GB1620668.2, dated Jul. 17, 2017, 5 pages.

* cited by examiner

DEMODULATOR FOR USE IN RADIO COMMUNICATION RECEIVERS

CROSS REFERENCE TO RELATED APPLICATIONS

This is the U.S. National Stage of International Application No. PCT/GB2017/053652 filed Dec. 4, 2017, which was published in English under PCT Article 21(2), which in turn claims the benefit of Great Britain Application No. 1620668.2, filed Dec. 5, 2016.

The present invention relates to demodulators for use in radio communication receivers, particularly to determining whether a received data packet was intended to be received by a given receiver or whether the reception of the data packet was erroneous and intended for a different receiver.

A radio signal modulated with a data packet typically comprises at least an address and a payload, wherein the address identifies the intended recipient of the data, and the payload contains any information that is meant to be conveyed by the data packet (e.g. audio data, video data, financial information, input and output signals to and from a control system, etc.). A radio transmitter will typically use any one of a number of modulation techniques known in the art per se to alter the properties of a carrier signal such as the amplitude (amplitude modulation), the frequency (frequency modulation), or the phase (phase modulation) in response to the 'symbols' of the data packet. In the most basic example, a string of digital '0's and '1's may be used to modulate the carrier signal by changing one of these properties between two discrete values, such that a radio receiver can observe the received signal and demodulate it in order to recover the data packet (i.e. the '0's and '1's) that were used by the transmitter when generating the radio signal.

When demodulating received radio signals in order to extract a data packet modulated onto a carrier signal, it is important for high-performance demodulators to correlate the beginning of the packet—often a synchronisation word (or "sync word") or the address—with a known sequence in order to achieve an estimate of both the frequency offset (i.e. a difference in frequency between the ideal nominal modulation frequency and the actual modulation frequency of the received signal) and the symbol timing (i.e. where each data symbol starts and finishes within the data packet). This sync word, known to both the transmitter and the receiver, is typically provided near the beginning of each frame, which the receiver can use to perform operations such as symbol timing recovery, frequency offset compensation, phase synchronisation, Automatic Gain Control (AGC) training and frame synchronisation, before the receiver decodes the message data (i.e. the payload) from the frame.

Such correlation may provide either "hard-matching", wherein a discriminator-based demodulator performs a symbol-wise comparison of the received signal and the known sequence in order to provide a definitive decision of whether or not the two match, or 'soft-matching', wherein a correlator-based demodulator provides a 'fuzzy' output that indicates how certain it is of a particular match without committing to a definitive decision.

If the sync word is also an address, which may take any value within an acceptable range usually determined by the radio protocol, and hard-matching of the address is desired, the Applicant has recognised that there are situations where the soft output from the correlator is not good enough in that it leads to false positives (i.e. reported matches that are actually incorrect) even if one or two (or in some cases even three) bits are flipped in the address portion of the data packet transmitted by the transmitter compared with the actual address to which the receiver is intended to respond. This may occur even if the received signal strength (RSS) is relatively high. Some radio communication protocols such as Bluetooth® Low Energy (BLE) have strict requirements for receivers to disregard data packets intended to be received by a different receiver.

Conventional correlator-based demodulators, known in the art per se, also suffer from frame synchronisation occurring too early. For example, the demodulator may inadvertently perform immediate frame synchronisation or on values stored in buffers from a previously received data packet, leading to a packet error rate (PER) of 100% in such cases. Erroneous frame synchronisation may also be carried out based on noise or on bits arriving at the checker before the correct segment, which may give rise to a PER of 15-30%.

The Applicant has recognised that as well as the erroneous synchronisation conditions described above, conventional radio receiver devices may be left in a 'hanging' condition if the demodulator 'front-end' (i.e. the portion of the demodulator that performs synchronisation) times out during reception of a packet but the 'back end' (i.e. the address checker) still expects to receive further bits from the data packet.

When viewed from a first aspect, the present invention provides a radio receiver device arranged to receive a radio signal modulated with a data packet including an address portion, said radio receiver comprising:
  a synchronisation circuit portion arranged to produce synchronisation information corresponding to the data packet;
  a demodulation circuit portion comprising a correlator, wherein said demodulation circuit portion is arranged to receive the radio signal and to produce an estimate of the address portion comprising a plurality of demodulated bits using said correlator and the synchronisation information;
  an address checking circuit portion arranged to receive the plurality of demodulated bits, to check said plurality of demodulated bits for a predetermined bit pattern, and to produce a match flag if it determines that the plurality of demodulated bits corresponds to the predetermined bit pattern;
  wherein the radio receiver device is arranged such that, upon detecting an upcoming timeout event, the demodulation circuit portion sends a timeout warning signal to the address checking circuit portion using a handshaking channel therebetween; said address checking circuit portion being arranged such that, if it receives the timeout warning signal, it stops checking the plurality of demodulated bits for the predetermined bit pattern.

This first aspect extends to a method for operating a radio receiver device, said method comprising:
  receiving a radio signal modulated with a data packet including an address portion;
  producing synchronisation information corresponding to the data packet;
  using a correlator and the synchronisation information to produce an estimate of the address portion comprising a plurality of demodulated bits;
  checking the plurality of demodulated bits for a predetermined bit pattern;
  producing a match flag if the plurality of demodulated bits corresponds to the predetermined bit pattern; and upon detection of an upcoming timeout event, stopping checking the plurality of demodulated bits for the predetermined bit pattern.

Thus when viewed from this first aspect, embodiments of the present invention provide an improved radio receiver device that is less susceptible to hanging. If the front-end of the radio device (i.e. the demodulation circuit portion) is due to time out, the handshaking channel provides a mechanism for the demodulation circuit portion to inform the address checking circuit portion that it should stop checking the demodulated bits for the predetermined pattern. This may prevent it from identifying an address match which would leave other parts of the radio expecting to receive data which would not be forthcoming (once the demodulator had timed out).

In a set of embodiments, the address checking circuit portion resumes checking the plurality of demodulated bits for the predetermined bit pattern when the timeout warning signal is removed or a further signal indicating the end of the timeout is sent using the handshake channel. This may be when the synchronisation circuit portion produces synchronisation information corresponding to a subsequent data packet. In such embodiments, the address checking circuit portion is effectively "muted" until new synchronisation information is produced by the synchronisation circuit portion. This subsequent data packet may be any number of data packets later depending on the length of the timeout, however the subsequent data packet is preferably the next data packet received by the radio receiver device that leads to the production of synchronisation information by the synchronisation circuit portion.

In a set of embodiments, the synchronisation circuit portion is arranged to estimate a frequency offset between a carrier frequency of the radio signal and a nominal carrier frequency. In a set of potentially overlapping embodiments, the synchronisation circuit portion is arranged to estimate symbol timing corresponding to the data packet. While there are different methods for obtaining synchronisation information relating to a packet known in the art per se, in a set of preferred embodiments the synchronisation circuit portion comprises a synchronisation correlator. The Applicant has appreciated that correlators are advantageous for synchronisation purposes for a number of reasons. First is the fact that correlators are able to operate relatively fast since it is not necessary to carry out a search or learning type of operation. Second is that since correlators can provide estimates of symbol timing as well as of frequency offset, rapid timing synchronization can be achieved which is advantageous in applications such as Bluetooth® and Bluetooth® Low Energy where there is limited time allowed in the protocol for synchronization. Third is that the correlator can also work as a packet detector since a valid 'peak' at the correlator output can also act as valid packet (frame) synchronization. Fourth is that it has been found that a suitably designed correlator may work satisfactorily under low signal-to-noise ratios (SNRs), i.e. the correlator does not become a limiting factor. One suitable synchronisation correlator, known in the art per se that may be used to carry out embodiments of the present invention is described in the Applicant's earlier publication WO 2014/167318 A2, which is incorporated herein by reference.

If a timeout event is imminent, the receipt of the timeout warning signal from the demodulation circuit portion may cause the address checking circuit portion to abandon the packet and take no further action and thus, in some embodiments, the address checking circuit portion is arranged not to produce the match flag upon receiving said timeout warning signal. However, in an alternative set of embodiments, the address checking circuit portion is arranged selectively to produce the match flag upon receiving said timeout warning signal. In such arrangements, the address checking portion may be arranged to declare a match, if it has one, immediately upon receiving the timeout warning signal. In other words, the timeout warning signal sets the last time at which the address checking circuit portion may declare a match before the timeout will occur. In some such embodiments, the address checking portion issues an abort timeout signal to the demodulation circuit portion, e.g. via the handshaking channel, if it produces the match flag following the timeout warning signal being received. It will be appreciated that this advantageously prevents the timeout from actually occurring.

In some embodiments, the radio receiver device further comprises a second demodulation circuit portion, wherein said second demodulation circuit portion is arranged to receive the data packet and produce a second plurality of demodulated bits. The second demodulation circuit portion may comprise a discriminator. A discriminator is a form of correlator, known per se which, preferably, is simpler and makes 'hard' decisions while the first demodulator preferably makes 'soft' decisions. Preferably the second demodulation circuit portion comprises a second address checking circuit portion, This creates a race condition wherein whichever of the two demodulators declares a match first subsequently receives the rest of the data packet. In such embodiments the timeout warning signal associated with the first demodulator is particularly advantageous as it prevents the first demodulator from 'winning the race' when the front end thereof has timed and so gives the second demodulator an opportunity to demodulate the packet.

The second address checking circuit portion may be arranged to receive the second plurality of bits a predetermined amount of time later than the first plurality of bits is received by the first address checking circuit portion. Thus in accordance with such embodiments, the second address checking portion may be arranged process the packet after a slight delay compared to the first address checking portion, such that the first arrangement comprising the correlator-based first demodulation circuit portion and the first address checking portion gets an advantage towards being first to declare a match. In other words, this delay between the first and second address checking circuit portions being able to declare a match is advantageous because it provides the first, correlator-based arrangement, which is typically the more sensitive one, to have a slight 'head start' over the second, e.g. discriminator-based demodulator arrangement The first demodulation circuit portion may, at least in preferred embodiments, comprise a high-performance demodulator while the second demodulation circuit portion may comprise a low-performance demodulator. It should be understood that the term "high-performance demodulator" as used herein refers to a demodulator that is more sensitive (and thus able to receive weaker signals) than the "low-performance demodulator". Typically such high-performance modulators are more vulnerable to erroneously matching when there are a small number of flipped bits in the address portion than low-performance demodulators. Viewed another way, in a set of embodiments the sensitivity of the first demodulation circuit portion is higher than the sensitivity of the second demodulation circuit portion. In a set of embodiments, the first demodulation circuit portion is at least 3 dB more sensitive than the second demodulation circuit portion.

The term "first" when used in the terms: the "first demodulation circuit portion"; the "first address checking circuit portion"; and "the first plurality of bits" should be understood to denote "the demodulation circuit portion", "the address checking circuit portion", and "the plurality of bits" described previously.

In a set of embodiments, the address checking circuit portion is arranged to produce the match flag only after a predetermined number of demodulated bits corresponding to the data packet have been received from the demodulation circuit portion. This prevents matches being declared too early, e.g. based on noise or on values from a previously received data packet that have not been properly cleared from a buffer being used by the address checking circuit portion. Using prior knowledge of the duration required before a match can be reasonably ascertained allows for such a lower limit to be set.

This is novel and inventive in its own right and thus, when viewed from a second aspect, the present invention provides a radio receiver device arranged to receive a radio signal modulated with a data packet including an address portion, said radio receiver comprising:

a synchronisation circuit portion arranged to produce synchronisation information corresponding to the data packet;

a demodulation circuit portion comprising a correlator, wherein said demodulation circuit portion is arranged to receive the radio signal and to produce an estimate of the an address portion comprising a plurality of demodulated bits using said correlator and the synchronisation information;

an address checking circuit portion arranged to receive the plurality of demodulated bits, to check said plurality of demodulated bits for a predetermined bit pattern, and to produce a match flag if it determines that the plurality of demodulated bits corresponds to the predetermined bit pattern and if a predetermined minimum number of demodulated bits corresponding to the estimate of the data packet have been received from the demodulation circuit portion.

This second aspect of the present invention extends to a method for operating a radio receiver device, said method comprising:

receiving a radio signal modulated with a data packet including an address portion;

producing synchronisation information corresponding to the data packet; using a correlator and the synchronisation information to produce an estimate of the an address portion comprising a plurality of demodulated bits;

checking the plurality of demodulated bits for a predetermined bit pattern;

producing a match flag the plurality of demodulated bits corresponds to the predetermined bit pattern and if a predetermined number of demodulated bits corresponding to the estimate of the data packet have been received from the demodulation circuit portion.

It will be appreciated that the preferred and optional features described hereinabove in relation to the first aspect apply equally to the second aspect where appropriate.

Certain embodiments of the invention will now be described, by way of example only, with reference to the accompanying drawings in which.

Figure 1:
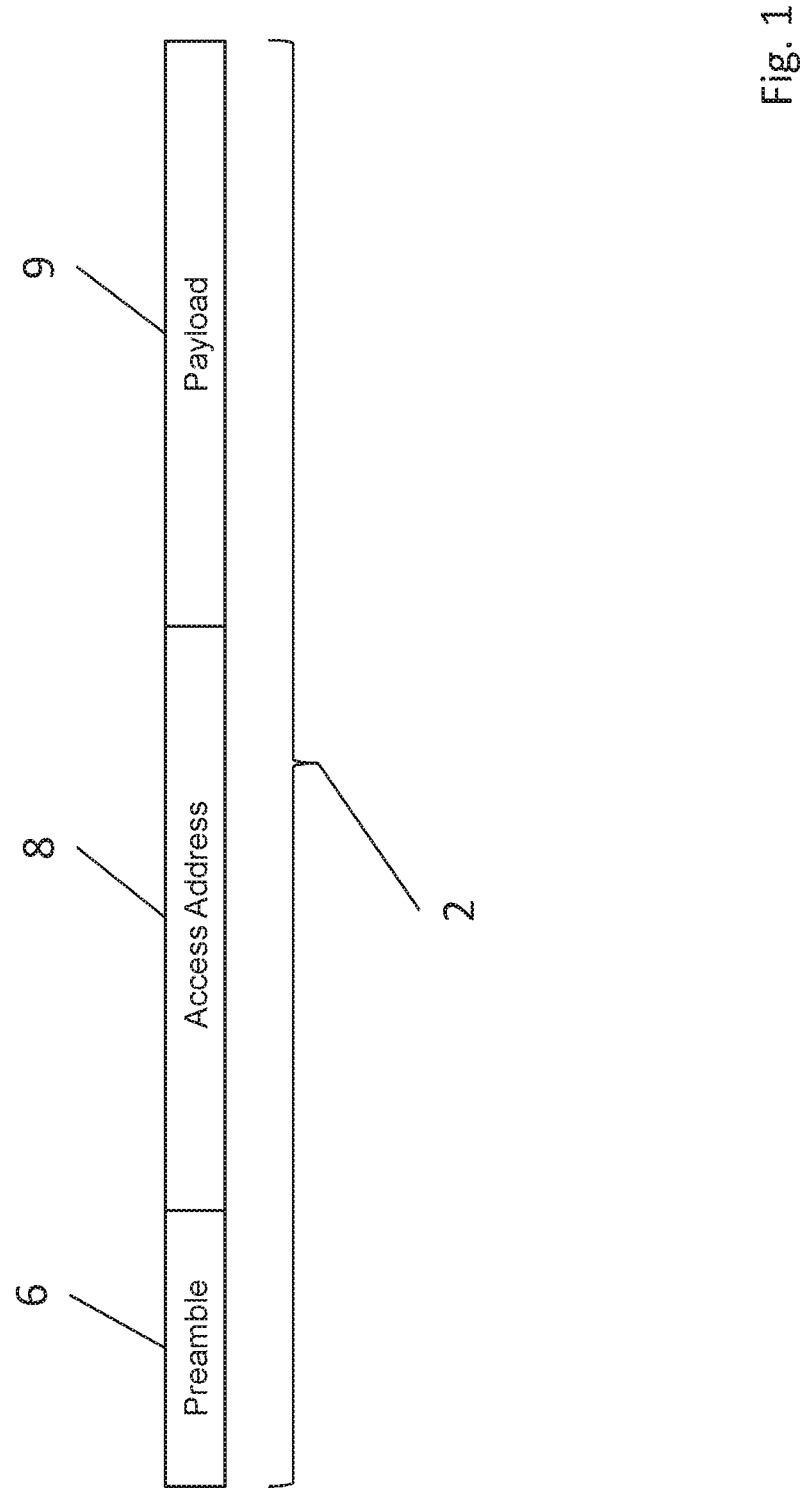
FIG. 1 is a diagram illustrating the typical structure of a data packet.

FIG. 1 is a simplified diagram illustrating the typical structure of a data packet 2 in a radio communications system such as Bluetooth® Low Energy (BLE). The data packet 2 comprises a preamble portion 6; an access address portion 8; and a payload portion 9, wherein the preamble portion 6 contains protocol-specific information regarding the packet 2 and the access address portion 8 contains data that identifies an intended recipient of the data packet 2, wherein the data (such as a message, audio data, video data, etc.) is contained within the payload portion 9.

Figure 2:
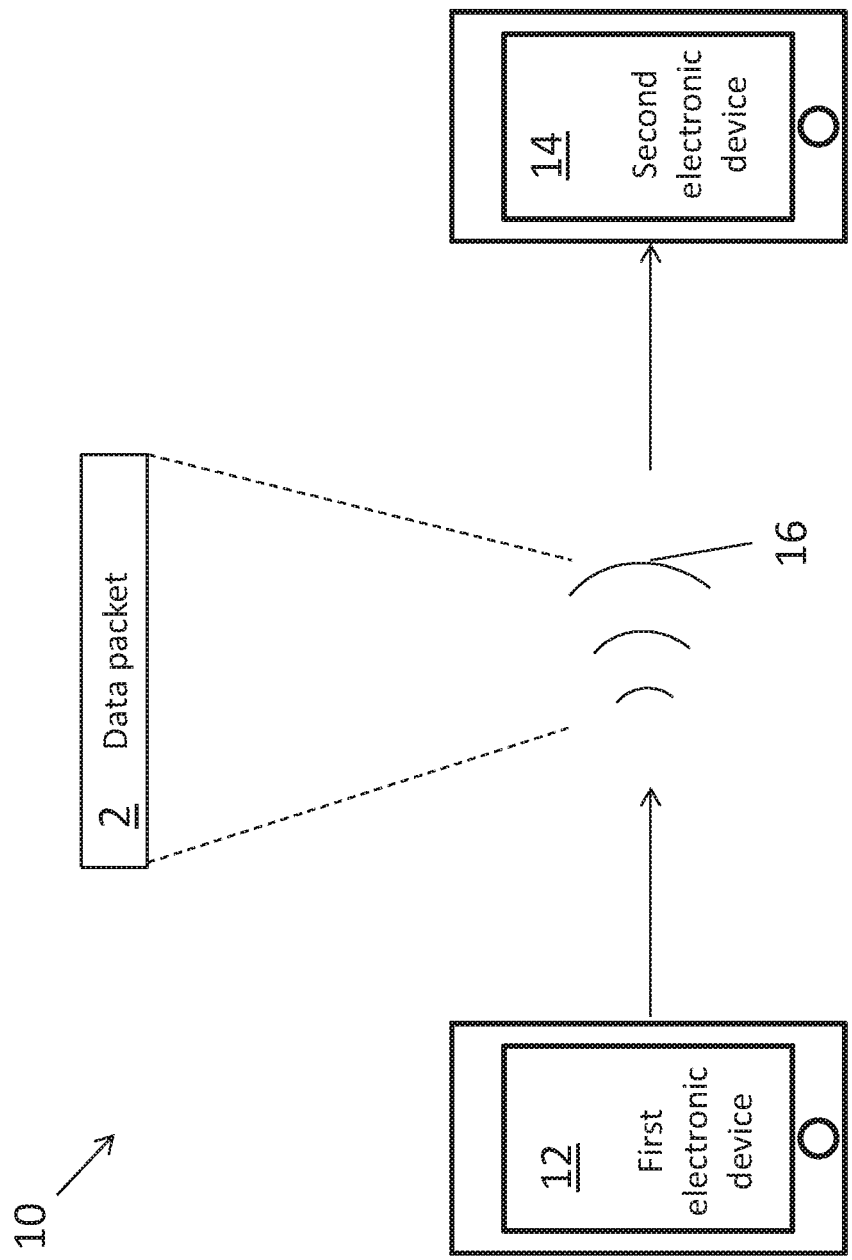
FIG. 2 is a schematic diagram of an exemplary radio communications system wherein a data packet with the structure shown in FIG. 1 is conveyed from one device to another via a radio signal.

FIG. 2 is a schematic diagram of an exemplary radio communications system 10 comprising a first electronic device 12 arranged to send a data packet 2 to a second electronic device 14 via a radio signal 16, wherein the data packet 2 has the structure described previously with reference to FIG. 1. The two devices 12, 14 are arranged to communicate with each other using a radio frequency communications protocol known in the art per se such as BLE. The data packet 2 including the address of the second device 14 is modulated onto the radio signal 16 by a transmitter (not shown) within the first electronic device 12. The second device 14 is arranged to check whether its address 18 matches the address portion of the data packet 2 following demodulation as will be explained below.

Figure 3:
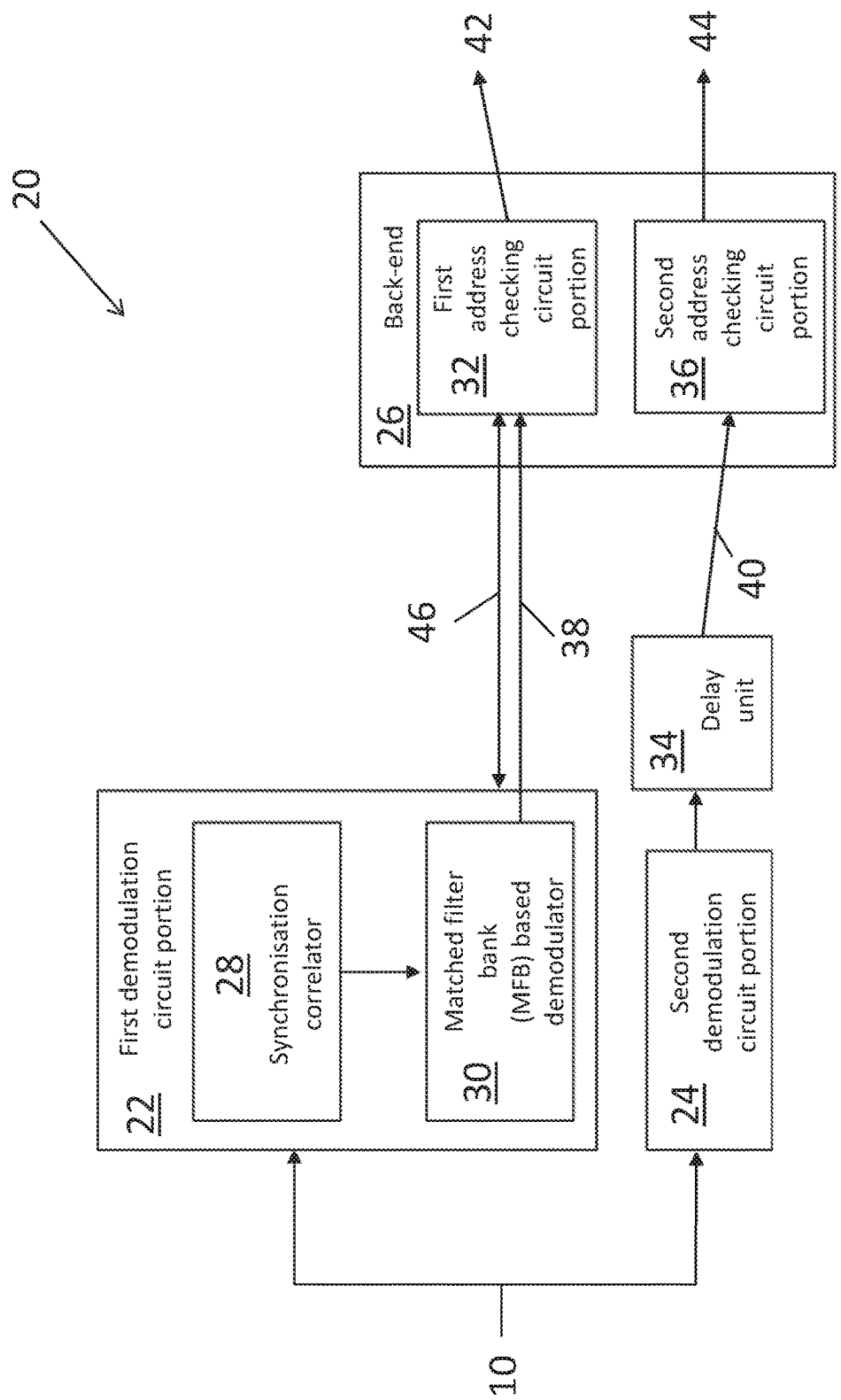
FIG. 3 is a schematic diagram of a radio receiver device in accordance with an embodiment of the present invention.

FIG. 3 is a schematic diagram of a radio receiver device 20 in accordance with an embodiment of the present invention. The radio receiver device 20 comprises: a first demodulation circuit portion 22; a second demodulation circuit portion 24; and an address checking circuit portion or "back-end" 26. The first demodulation circuit portion 22 comprises: a synchronisation correlator 28 and a matched filter bank (MFB) based demodulator 30. Unlike the correlator-based demodulation circuit portion 22, the second demodulation circuit portion 24 is discriminator-based. These first and second demodulation circuit portions 22, 24 are described in further detail below with reference to FIGS. 4A and 4B. Both the first demodulation circuit portion 22 and the second demodulation circuit portion 24 are arranged to receive the radio signal 10 and produce first and second demodulated bitstreams 38 and 40 respectively. The first demodulated bitstream 38 produced by the first demodulation circuit portion 22 is input to a first address checking circuit portion 32. Similarly the second demodulated bitstream 40 produced by the second demodulation circuit portion 24 is input to a second address checking circuit portion 36 via a delay unit 34.

The synchronisation correlator 28 within the first demodulation circuit portion 22 may, by way of example only, be similar to that described in the Applicant's earlier publication WO 2014/167318 A2. Briefly, the synchronisation correlator 28 performs a holistic pattern matching operation on a fixed number of bits from the data packet 2. For example, the synchronisation correlator 28 may match sixteen bits (i.e. two octets) taken from the end of the preamble 6 and the beginning of the address portion 8, to a known sequence. The synchronisation correlator 28 produces an estimate of any frequency offset (i.e. a difference in frequency between the ideal nominal modulation frequency and the actual modulation frequency of the received signal 10) and the symbol timing (i.e. where each data symbol starts and finishes within the data packet 2). This synchronisation information (i.e. the frequency offset estimate and the symbol timing information) are input to the MFB-based demodulator 30. The MFB-based demodulator 30 uses this information to compare the remaining bits of the data packet 2 to each possible bit sequence combination. The MFB-based demodulator 30 produces a stream of 'soft' bit values, wherein each of these soft bit values corresponds to a confidence level regarding whether the corresponding bit in the data packet 2 was a digital "0" or "1". This stream of soft bits may then, by way of example only, be input to a Viterbi decoder that determines the most likely bit sequence corresponding to the received data packet 2. The resulting demodulated bit sequence 38 is input to the first address checking circuit portion 32. The demodulated bitstream 38 produced by the first demodulation circuit portion 22 comprises a plurality of demodulated bits corresponding to all the bits of the data packet 2 except for those "consumed" by the synchronisation correlator 28 (e.g. the first 16 bits).

By way of contrast, the second demodulation circuit portion 24 utilises a discriminator to determine directly (e.g. by applying a threshold) a second demodulated bitstream 40 which is input to the second address checking circuit portion 36. However, unlike the first demodulated bitstream 38, the second demodulated bitstream 40 comprises bits corresponding to all of the bits within the data packet 2 as no bits are consumed by the second demodulation circuit portion 24. Any synchronisation information required by the second demodulation circuit portion 24 can be recovered from the preamble portion 6 of the data packet 2 alone.

Each of the address checking circuit portions 32, 36 is arranged to compare the corresponding demodulated bitstream 38, 40 to a known bit pattern and, if a match is found, to produce a respective match flag 42, 44. This correlation operation typically involves using a "sliding window" of the demodulated bitstreams 38, 40 to the known bit pattern. The respective sliding windows used by the address checking circuit portions 32, 36 may have the same width or may have different widths, for example three bits, five bits, etc. Sliding window-based correlation yields a number of "observations" for each bit—for example with a three bit sliding window, each bit within the bitstream 38, 40 will be checked against part of the known bit pattern three times (with a possible exception for the terminal bits at the start and/or end of the data packet 2). It will be appreciated that whichever pairing of demodulation circuit portion 22, 24 and address checking circuit portion 32, 36 produces its respective match flag 42, 44 first, will typically "win" and process the rest of the corresponding data packet 2. As it is preferred that the first demodulation circuit portion 22 and address checking circuit portion 32 processes the data packet 2 because this is the more sensitive demodulator, the delay unit 34 places the second address checking circuit portion 36 at an intentional disadvantage compared to the first address checking circuit portion 32.

If the first demodulation circuit portion 22 detects that a timeout event is imminently going to occur within it, it issues a timeout warning signal on a handshaking channel 46 to the first address checking circuit portion 32. Depending on the protocol being used, this may cause the address checking circuit portion 32 to become effectively "muted" and thus unable to produce its match flag 42 until the warning signal on the handshaking channel 46 is reset—e.g. when new synchronisation information is produced by the synchronisation correlator 28 which indicates that a new data packet is being received. However, in other arrangements the address checking circuit portion 32 may be arranged to provide an intermediate match flag 42 immediately upon receiving the timeout warning signal if it believes that the first demodulated bitstream 38 is a match. In other words, the timeout warning signal sets the last time at which the first address checking circuit portion 32 may declare a match before the timeout will actually occur. If the match flag 42 is produced following receipt of the timeout warning signal, an abort timeout signal may be sent back to the first demodulation circuit portion 22 via the handshaking channel 46 in order to cancel the timeout. The handshaking channel 46 prevents the first address checking circuit portion 32 from providing the match flag 42 following a timeout of the first demodulation circuit portion 22 which would result in the rest of the receiver waiting for bits that do not arrive. This allows the second demodulation circuit portion 24 and the second address checking circuit portion 36 to achieve a match instead.

Figure 4A:
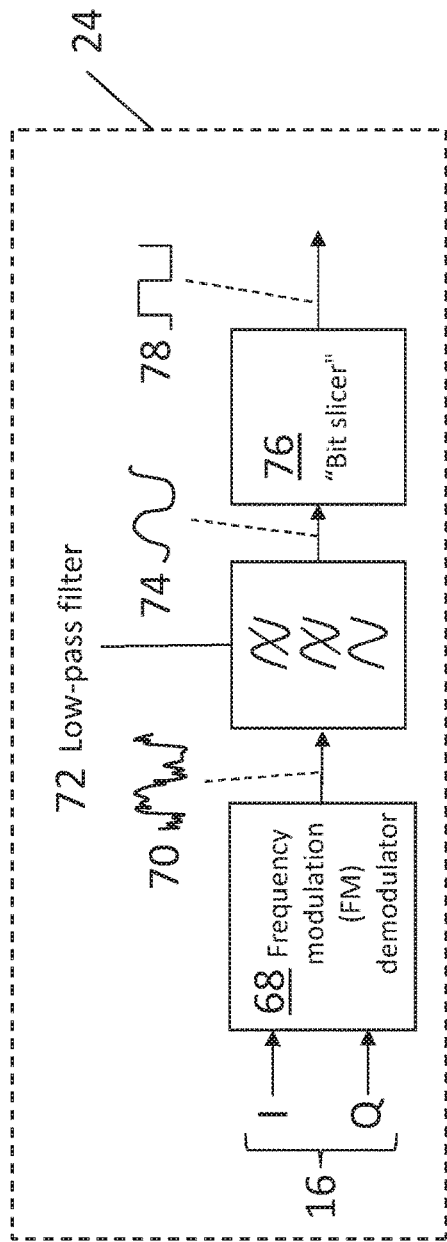
FIGS. 4A and 4B are block diagrams of low-performance and high-performance demodulators suitable for use in the radio receiver of FIG. 3 respectively.
Figure 4B:
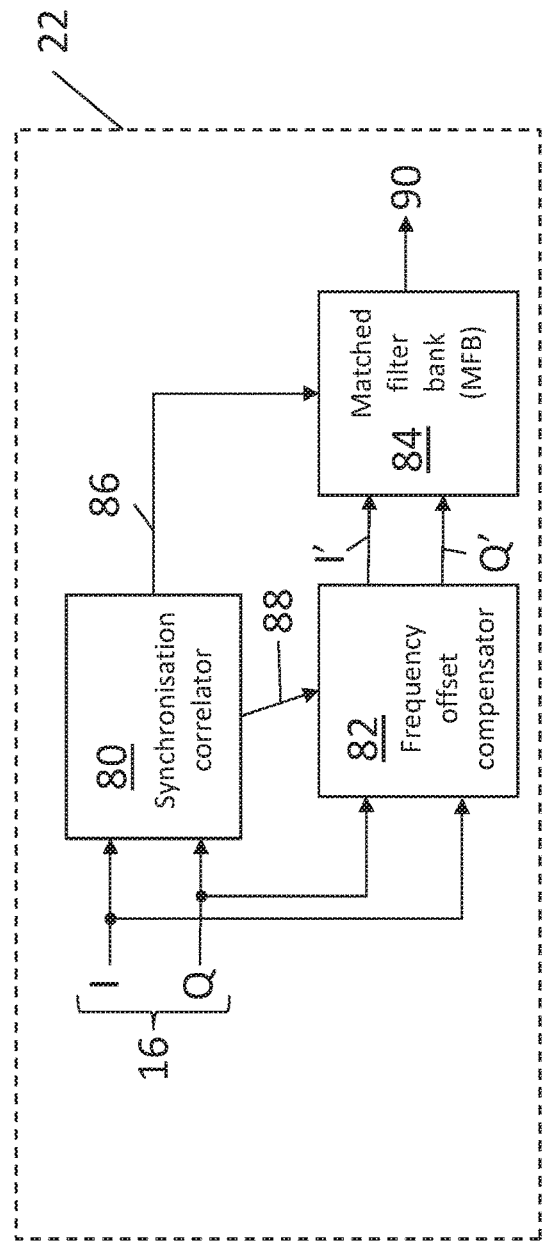

FIGS. 4A and 4B are respective block diagrams of the first, 'high-performance' demodulation circuit portion 22 and the second, low-performance demodulation circuit portion 24 suitable for use in the radio receiver device 20 of FIG. 3. It will of course be appreciated that these are merely exemplary arrangements and other demodulation circuit arrangements may be readily applied in accordance with the present invention.

The low-performance demodulation circuit portion 24 shown in FIG. 4A comprises: a frequency modulation (FM) demodulator 68; a low-pass filter 72; and a "bit slicer" 76. In-phase (I) and quadrature (Q) components of the radio signal 16 are input to the FM demodulator 68 which provides a demodulated signal 70. This demodulated signal 70 is input to the low-pass filter 72 which removes any unwanted high frequency components (e.g. noise), so as to produce a filtered signal 74. The filtered signal 74 is input to the bit slicer 76 which applies a threshold to the filtered signal 74 in order to produce a digital output signal 78.

The high-performance demodulation circuit portion 30 shown in FIG. 4B comprises: a synchronisation correlator 80; a frequency offset compensator 82; and a matched filter bank (MFB) 84. In-phase (I) and quadrature (Q) components of the radio signal 16 are input to the synchronisation correlator 80 and the frequency offset compensator 82. The synchronisation correlator 80 is arranged to correlate the I and Q signals with a known sequence in order to determine when a packet 2 has been detected and produce a detection signal 86, which provides symbol timing information, and a frequency offset signal 88, wherein the frequency offset signal 88 is an estimate of any offset between the nominal frequency of the I and Q signals (i.e. the frequency of the radio signal 16) and the expected frequency of the radio signal 16.

The frequency offset signal 88 produced by the synchronisation correlator 80 is input to the frequency offset compensator 82 which adjusts for the frequency offset and produces compensated in-phase (I') and quadrature (Q') signals which are input to the MFB 84, which also receives the symbol timing information (i.e. the detection signal 86) from the synchronisation correlator 80. The MFB 84 comprises a "bank" of all possible bit sequences, which it compares the incoming I' and Q' signals to in order to determine a "confidence level" for each potential match. The MFB 84 produces an output signal 90 which may, in some arrangements, be a "soft" output, that indicates a confidence level for each bit (e.g. a value between 0 and 1, wherein the closer a given value is to 0 indicates stronger confidence that the corresponding bit is a digital '0' whereas the closer a given value is to 1 indicates stronger confidence that the corresponding bit is a digital '1'. however, it will be appreciated that, in some arrangements, a final "hard" decision may be made for each bit, e.g. by applying a threshold or by inputting the signal 90 to a Viterbi decoder.

Figure 5:
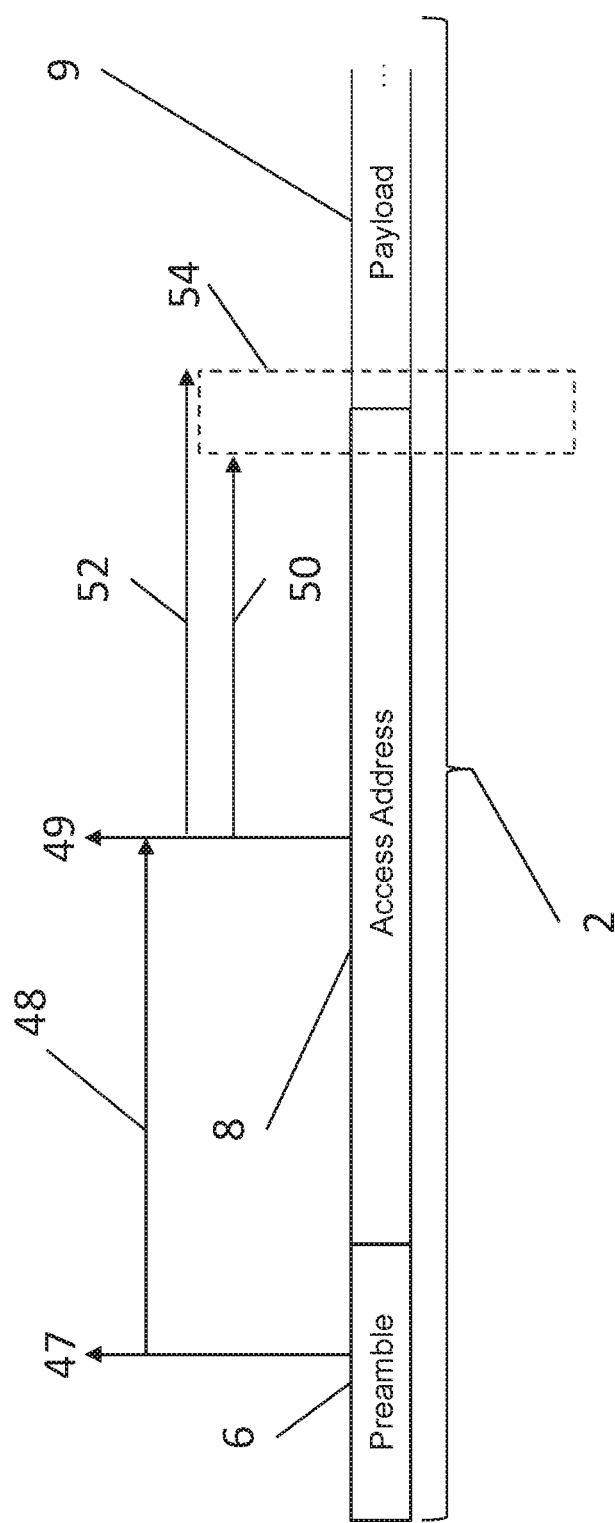
FIG. 5 is diagram illustrating how the radio receiver device of FIG. 3 operates on the packet of FIG. 1 in accordance with an embodiment of the present invention.

FIG. 5 is a diagram illustrating a method for operating the radio receiver device 20 of FIG. 3 in accordance with an embodiment of the present invention. Initially upon receiving the data packet 2, the synchronisation correlator 28 begins trying to obtain synchronisation information such as an estimate of the frequency offset and the symbol timing for a particular synchronisation window 48. Following a synchronisation event 49 that occurs once the synchronisation correlator 28 produces the required synchronisation information, the radio receiver device 20 may set a minimum bit length 50 that corresponds to a minimum number of bits within the first demodulated bitstream 38 produced by the MFB-based demodulator 30 that must be received by the first address checking circuit portion 32 before it is permitted to declare a match via its match flag 42 output. Similarly, the radio receiver device 20 may define a maximum bit length 52 corresponding to the maximum number of bits within the bitstream 38 that may be received by the first address checking circuit portion 32 before it is no longer permitted to declare a match. Due to the handshaking channel 46 between the first demodulation circuit portion 22 and the back-end 26 (providing the timeout warning signal), this maximum bit length 52 does not need to extend much beyond the length of the data packet 2 as the back-end 26 knows that if a timeout were imminent, it would receive a timeout warning signal. This defines a small window 54 in which it is possible for the first address checking circuit portion 32 to declare a match should it find one. Ideally, this window 54 is as small as possible, however it is typically wider than 1 bit to allow for slight errors such as jitter. This small window 54 in which the first address checking circuit portion 32 is able to declare a match reduces the chance of false positive match flags 42 being produced by the first address checking circuit portion 32, for example due to noise or due to the first address checking circuit portion 32 making decisions based on previous values of the bitstream 38 that remain in its buffers from a previous data packet that have not been cleared properly.

Thus it will be appreciated by those skilled in the art that embodiments of the present invention described herein provide an improved radio receiver device that may be less susceptible to hanging and/or to erroneously declaring address matches due to unwanted noise or buffers retaining bit values corresponding to a previously received data packet. It will be appreciated by those skilled in the art that the embodiments described above are merely exemplary and are not limiting on the scope of the invention.

The invention claimed is:

1. A radio receiver device arranged to receive a radio signal modulated with a data packet including an address portion, said radio receiver comprising:
a synchronisation circuit portion arranged to produce synchronisation information corresponding to the data packet;
a demodulation circuit portion comprising a correlator, wherein said demodulation circuit portion is arranged to receive the radio signal and to produce an estimate of the address portion comprising a plurality of demodulated bits using said correlator and the synchronisation information;
an address checking circuit portion arranged to receive the plurality of demodulated bits, to check said plurality of demodulated bits for a predetermined bit pattern, and to produce a match flag if it determines that the plurality of demodulated bits corresponds to the predetermined bit pattern;
wherein the radio receiver device is arranged such that, upon detecting an upcoming timeout event, the demodulation circuit portion sends a timeout warning signal to the address checking circuit portion using a handshaking channel therebetween; said address checking circuit portion being arranged such that, if it receives the timeout warning signal, it stops checking the plurality of demodulated bits for the predetermined bit pattern.

2. The radio receiver device as claimed in claim 1 wherein the address checking circuit portion is configured to resume checking the plurality of demodulated bits for the predetermined bit pattern when the timeout warning signal is removed or a further signal indicating the end of the timeout is sent using the handshake channel.

3. The radio receiver device as claimed in claim 2 wherein the timeout warning signal is removed or said further signal indicating the end of the timeout is sent when the synchronisation circuit portion produces synchronisation information corresponding to a subsequent data packet.

4. The radio receiver device as claimed in claim 3 wherein the subsequent data packet is the next data packet received by the radio receiver device that leads to the production of synchronisation information by the synchronisation circuit portion.

5. The radio receiver device as claimed in claim 1, wherein the synchronisation circuit portion is arranged to estimate a frequency offset between a carrier frequency of the radio signal and a nominal carrier frequency.

6. The radio receiver device as claimed in claim 1, wherein the synchronisation circuit portion is arranged to estimate symbol timing corresponding to the data packet.

7. The radio receiver device as claimed in claim 1, wherein the synchronisation circuit portion comprises a synchronisation correlator.

8. The radio receiver device as claimed in claim 1, wherein the address checking circuit portion is arranged not to produce the match flag upon receiving said timeout warning signal.

9. The radio receiver device as claimed claim 1, wherein the address checking circuit portion is arranged selectively to produce the match flag upon receiving said timeout warning signal.

10. The radio receiver device as claimed in claim 9, wherein the address checking portion is arranged to declare a match, if it has one, immediately upon receiving the timeout warning signal.

11. The radio receiver device as claimed in claim 10, wherein the address checking portion issues an abort timeout signal to the demodulation circuit portion if it produces the match flag following the timeout warning signal being received.

12. The radio receiver device as claimed in claim 1, further comprising a second demodulation circuit portion, wherein said second demodulation circuit portion is arranged to receive the data packet and produce a second plurality of demodulated bits.

13. The radio receiver device as claimed in claim 12, wherein the second demodulation circuit portion comprises a discriminator.

14. The radio receiver device as claimed in claim 12, wherein the second demodulation circuit portion comprises a second address checking circuit portion.

15. The radio receiver device as claimed in claim 12, wherein the second address checking circuit portion is arranged to receive the second plurality of bits a predetermined amount of time later than the first plurality of bits is received by the first address checking circuit portion.

16. The radio receiver device as claimed in claim 12, wherein the first demodulation circuit portion comprises a high-performance demodulator and the second demodulation circuit portion comprises a low-performance demodulator.

17. The radio receiver device as claimed in claim 12, wherein the first demodulation circuit portion is at least 3 dB more sensitive than the second demodulation circuit portion.

18. The radio receiver device as claimed in claim 1, wherein the address checking circuit portion is arranged to produce the match flag only after a predetermined number of demodulated bits corresponding to the data packet have been received from the demodulation circuit portion.

19. A radio receiver device arranged to receive a radio signal modulated with a data packet including an address portion, said radio receiver comprising:
a synchronisation circuit portion arranged to produce synchronisation information corresponding to the data packet;
a demodulation circuit portion comprising a correlator, wherein said demodulation circuit portion is arranged to receive the radio signal and to produce an estimate of the an address portion comprising a plurality of demodulated bits using said correlator and the synchronisation information;
an address checking circuit portion arranged to receive the plurality of demodulated bits, to check said plurality of demodulated bits for a predetermined bit pattern, and to produce a match flag if it determines that the plurality of demodulated bits corresponds to the predetermined bit pattern and if a predetermined minimum number of demodulated bits corresponding to the estimate of the data packet have been received from the demodulation circuit portion.

20. A method of operating a radio receiver device, said method comprising:
receiving a radio signal modulated with a data packet including an address portion;
producing synchronisation information corresponding to the data packet;
using a correlator and the synchronisation information to produce an estimate of the address portion comprising a plurality of demodulated bits;
checking the plurality of demodulated bits for a predetermined bit pattern;
producing a match flag if the plurality of demodulated bits corresponds to the predetermined bit pattern; and
upon detection of an upcoming timeout event, stopping checking the plurality of demodulated bits for the predetermined bit pattern.

21. The method as claimed in claim 20 comprising the address checking circuit resumes checking the plurality of demodulated bits for the predetermined bit pattern when the timeout warning signal is removed or a further signal indicating the end of the timeout is sent using the handshake channel.

22. The method as claimed in claim 21 comprising removing the timeout warning signal or sending said further signal indicating the end of the timeout when the synchronisation circuit portion produces synchronisation information corresponding to a subsequent data packet.

23. The method as claimed in claim 22 wherein the subsequent data packet is the next data packet received by the radio receiver device that leads to the production of synchronisation information by the synchronisation circuit portion.

24. The method as claimed in claim 20, comprising the synchronisation circuit portion estimating a frequency offset between a carrier frequency of the radio signal and a nominal carrier frequency.

25. The method as claimed in claim 20, comprising the synchronisation circuit portion estimating symbol timing corresponding to the data packet.

26. The method as claimed in claim 20, wherein the synchronisation circuit portion comprises a synchronisation correlator.

27. The method as claimed in claim 20, comprising the address checking circuit portion not producing the match flag upon receiving said timeout warning signal.

28. The method as claimed in claim 20, comprising the address checking circuit portion selectively producing the match flag upon receiving said timeout warning signal.

29. The method as claimed in claim 28, comprising the address checking portion declaring a match, if it has one, immediately upon receiving the timeout warning signal.

30. The method as claimed in claim 29, comprising the address checking portion issuing an abort timeout signal to the demodulation circuit portion if it produces the match flag following the timeout warning signal being received.

31. The method as claimed in claim 20, wherein the radio receiver further comprises a second demodulation circuit portion which receives the data packet and produce a second plurality of demodulated bits.

32. The method as claimed in claim 31, wherein the second demodulation circuit portion comprises a discriminator.

33. The method as claimed in claim 31, wherein the second demodulation circuit portion comprises a second address checking circuit portion.

34. The method as claimed in claim 31, comprising the second address checking circuit portion receiving the second plurality of bits a predetermined amount of time later than the first plurality of bits is received by the first address checking circuit portion.

35. The method as claimed in claim 31, wherein the first demodulation circuit portion comprises a high-performance demodulator and the second demodulation circuit portion comprises a low-performance demodulator.

36. The method as claimed in claim 31, wherein the first demodulation circuit portion is at least 3 dB more sensitive than the second demodulation circuit portion.

37. The method as claimed in claim 20, comprising the address checking circuit portion producing the match flag only after a predetermined number of demodulated bits corresponding to the data packet have been received from the demodulation circuit portion.

38. A method of operating a radio receiver device, said method comprising:
receiving a radio signal modulated with a data packet including an address portion;
producing synchronisation information corresponding to the data packet;

using a correlator and the synchronisation information to produce an estimate of the an address portion comprising a plurality of demodulated bits;
checking the plurality of demodulated bits for a predetermined bit pattern;
producing a match flag the plurality of demodulated bits corresponds to the predetermined bit pattern and if a predetermined number of demodulated bits corresponding to the estimate of the data packet have been received from the demodulation circuit portion.

* * * * *